US009435210B2

(12) United States Patent
Bacha et al.

(10) Patent No.: US 9,435,210 B2
(45) Date of Patent: Sep. 6, 2016

(54) COOLED TURBINE BLADE FOR GAS TURBINE ENGINE (71) Applicant: SNECMA, Paris (FR)

(72) Inventors: Jean-Luc Bacha, Paris (FR);
Emmanuel Berche, Vernou la Celle sur Seine (FR); Tangi Brusq, Fontainebleau (FR)

(73) Assignee: SNECMA, Paris (FR)

( * ) Notice: Subject to any disclaimer, the term of this patent is extended or adjusted under 35 U.S.C. 154(b) by 748 days.

(21) Appl. No.: 13/693,649

(22) Filed: Dec. 4, 2012

(65) Prior Publication Data

US 2013/0142668 A1 Jun. 6, 2013

(30) Foreign Application Priority Data

Dec. 6, 2011 (FR) ...................................... 11 61206

(51) Int. Cl.
*F01D 5/14* (2006.01)
*F01D 5/20* (2006.01)
*F01D 25/12* (2006.01)

(52) U.S. Cl.
CPC ................. *F01D 5/147* (2013.01); *F01D 5/20* (2013.01); *F01D 25/12* (2013.01); *F05D 2250/314* (2013.01); *F05D 2250/70* (2013.01); *F05D 2260/201* (2013.01); *F05D 2260/221* (2013.01); *Y02T 50/673* (2013.01); *Y02T 50/676* (2013.01)

(58) Field of Classification Search
CPC .......... F01D 5/18; F01D 5/186; F01D 5/187; F01D 5/188; F01D 5/20; F01D 11/08
See application file for complete search history.

(56) References Cited

U.S. PATENT DOCUMENTS 3,899,267 A * 8/1975 Dennis ...................... F01D 5/20
416/228
6,231,307 B1 * 5/2001 Correia ................... F01D 5/186
415/115

(Continued)

FOREIGN PATENT DOCUMENTS

EP 1 057 970 A2 12/2000
EP 1 557 533 A1 7/2005

(Continued)

OTHER PUBLICATIONS

French Preliminary Search Report issued Sep. 18, 2012 in corresponding French Application No. 11 61206 filed Dec. 6, 2011 (with an English Translation of Categories).

*Primary Examiner* — Dwayne J White
*Assistant Examiner* — Julian Getachew
(74) *Attorney, Agent, or Firm* — Oblon, McClelland, Maier & Neustadt, L.L.P (57) ABSTRACT A cooled turbine blade for a gas turbine engine including a pressure surface wall, a suction surface wall and a distal wall connecting the pressure surface wall and the suction surface wall, arranged so as to create in the region of the distal end of the blade at least one external cavity forming a bathtub-shaped cavity and at least one internal cavity separated by the distal wall, the blade having at least one opening for the introduction of a flow of cooling air into the external cavity, wherein, on the one hand, at least one part of the distal wall is inclined relative to the verticals of the pressure surface wall and, on the other hand, the opening is created in the vicinity of the distal wall so that the flow of cooling air is directed towards the distal end of the pressure surface wall.

8 Claims, 5 Drawing Sheets

(56) References Cited

U.S. PATENT DOCUMENTS

| | | |
|---|---|---|
| 2004/0226682 A1 | 11/2004 | Ehrhard et al. |
| 2007/0237637 A1 | 10/2007 | Lee et al. |
| 2010/0047057 A1 | 2/2010 | Kopmels |
| 2010/0098554 A1 | 4/2010 | Cheong et al. |
| 2010/0290921 A1* | 11/2010 | Mhetras .................... 416/97 R |
| 2011/0255990 A1 | 10/2011 | Diamond et al. |

FOREIGN PATENT DOCUMENTS

| | | |
|---|---|---|
| EP | 1 762 701 A2 | 3/2007 |
| EP | 2 141 327 A2 | 1/2010 |
| EP | 2 148 042 A2 | 1/2010 |
| EP | 2 378 076 A1 | 10/2011 |

\* cited by examiner

COOLED TURBINE BLADE FOR GAS TURBINE ENGINE

BACKGROUND OF THE INVENTION

1. Field of the Invention

The present invention relates to the field of gas turbine engines such as turbojet engines.

2. Description of the Related Art

A multi-flow (for example dual-flow) turbojet engine, for the propulsion of commercial aircraft, generally comprises an upstream fan delivering an annular airflow, said flow comprising a primary central annular part, which supplies the motor driving the fan, in addition to a secondary external annular part, designed to be ejected into the atmosphere whilst providing a significant proportion of the thrust.

The airflow passing through the engine is compressed again to supply a combustion chamber, the gases thereof emerging from said chamber are then expanded in the turbine stages. To obtain the best possible efficiency, the gases leaving the chamber have to be at a high temperature, taking into account the behaviour of the materials forming the high pressure turbine immediately downstream of the combustion chamber. The high pressure turbine blades are cooled by the circulation of an airflow inside the aerofoil portion. Part of the cooling air is discharged through the wall of the bathtub-shaped cavity located at the distal end of said aerofoil portion.

Each blade comprises a pressure surface wall and a suction surface wall, in addition to a distal wall arranged at the distal end (at the apex) of the blade. Said walls are arranged so as to create, in the region of the distal end of the blade, at least one internal cavity and at least one external cavity, forming said bathtub-shaped cavity, separated from one another by the distal wall.

As the distal end of the pressure surface wall is particularly exposed, the apex of the blade is rapidly oxidized, which causes a loss of metal and thus eventually an increase in clearance in the region of the apex and, as a result, a reduction in the efficiency of the turbojet engine.

In order to cool the distal end of the pressure surface wall, it is already known to create therein openings for the flow of cooling air. More specifically, said openings take the form of holes made in the region of the pressure surface wall, not far from the distal wall and opening into the internal cavity.

Although such openings effectively permit the cooling of the extreme distal zone of the internal cavity of the blade, they prove to be located too far from the distal end of the pressure surface wall to cool it correctly.

BRIEF SUMMARY OF THE INVENTION

The subject of the present invention is to modify the geometry of the distal end of a turbine blade in order to permit improved ventilation of said zone.

To this end, according to the invention, the cooled turbine blade for a gas turbine engine comprising a pressure surface wall, a suction surface wall and a distal wall connecting the pressure surface wall and the suction surface wall, arranged so as to create in the region of the distal end of the blade at least one internal cavity and at least one external cavity, forming a bathtub-shaped cavity, separated by the distal wall, the blade having at least one opening for the introduction of a flow of cooling air into the external cavity, is noteworthy in that, on the one hand, the distal wall is inclined relative to the verticals of the pressure surface wall and, on the other hand, the opening is created in the vicinity of the distal wall so that the flow of cooling air is directed towards the distal end of the pressure surface wall.

Thus, by means of the present invention, the opening for the flow of cooling air is located directly on the distal wall, known as the bottom of the bathtub-shaped cavity, at least one portion thereof being inclined so as to direct said airflow towards the pressure surface wall, which makes it possible to pass said flow from the internal cavity to the external cavity where it may be applied directly to the pressure surface wall. The passage of the flow of cooling air thus permits the apex of the blade to be cooled effectively.

Furthermore, the incline of the distal wall makes it possible not only to orient the opening (and thus the flow of cooling air) in an appropriate manner towards the distal end of the pressure surface wall but also to subject the distal part of the blade on the suction side to pressure.

Preferably, the opening is created in the vicinity of the distal wall so that the flow of cooling air is not directed towards the distal end of the suction surface wall. Thus more attention is given to the distal end of the pressure surface wall which constitutes the hottest part, which thus makes it possible to use the flow of cooling air optimally, without additionally increasing the number of openings required.

Preferably, the opening is created in the vicinity of the distal wall so that the entire flow of cooling air is directed towards the distal end of the pressure surface wall. Thus, by means of a suitable orientation of the opening (directly towards the distal end of the pressure surface wall) it is not necessary for said opening to have large dimensions in order to direct the flow of cooling air to the distal end of the pressure surface wall.

Moreover, the opening may be created in the vicinity of the distal wall so that the flow of cooling air is directed towards the distal end of the pressure surface wall and passes along said wall, which makes it possible to cool the entire wall rather than a small portion thereof.

Preferably, the axis of the opening is at least substantially inclined relative to the verticals of the pressure surface wall.

In this last case, the axis of the opening may be at least substantially at right angles to the pressure surface wall which makes it possible to direct the flow of cooling air (along the axis of the opening) directly towards the distal end of the pressure surface wall.

According to a first embodiment of the invention, the entire distal wall is inclined relative to the verticals of the pressure surface wall, which makes it all the more possible to subject the distal part of the blade on the suction side to pressure.

According to a second embodiment of the invention, a portion of the distal wall is located in a plane at least substantially at right angles to the verticals of the pressure surface wall.

The present invention also relates to a gas turbine engine, comprising at least one turbine blade according to one of the embodiments disclosed above.

BRIEF DESCRIPTION OF THE SEVERAL VIEWS OF THE DRAWINGS

The figures of the accompanying drawing will explain clearly how the invention may be implemented. In said figures, identical reference numerals denote similar elements.

DETAILED DESCRIPTION OF THE INVENTION

Figure 1:
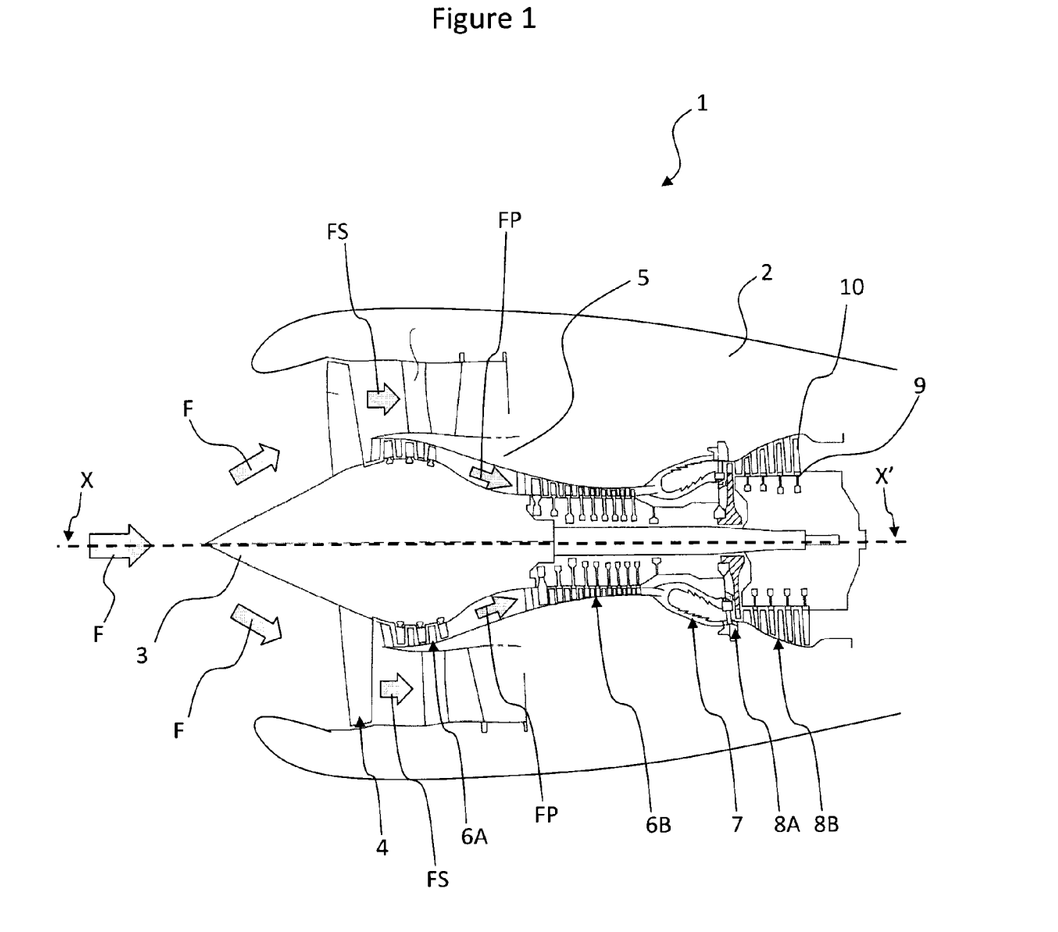
FIG. 1 is a sketch along a cross-sectional plane of a turbojet engine.

The turbojet engine 1 of FIG. 1 is of the dual-flow and dual-body type, having a symmetry of revolution about an axis X-X'. In the known manner, said turbojet engine 1 comprises, within a nacelle 2 serving as a casing for its various members, an air inlet through which an inlet airflow F may penetrate, to pass subsequently through an inlet fan 4 arranged about an air inlet cone 3 which permits the aerodynamic guidance and distribution of the total flow F about the axis X-X'. Said airflow F is then separated into two flows, respectively the primary flow FP and the secondary flow FS, via an intermediate housing 5 of which the end forms a separator nose.

In the remainder of the description, the terms "upstream" and "downstream" relate to axial positions along the longitudinal axis X-X' in the direction of the flow of the airflow in the turbojet engine 1.

The primary flow FP successively passes through a plurality of low pressure compression stages 6A, a plurality of high pressure compression stages 6B, a combustion chamber 7, a high pressure turbine stage 8A and a plurality of low pressure turbine stages 8B, finally to be ejected from the turbojet engine through a nozzle (not referenced).

Figure 2:
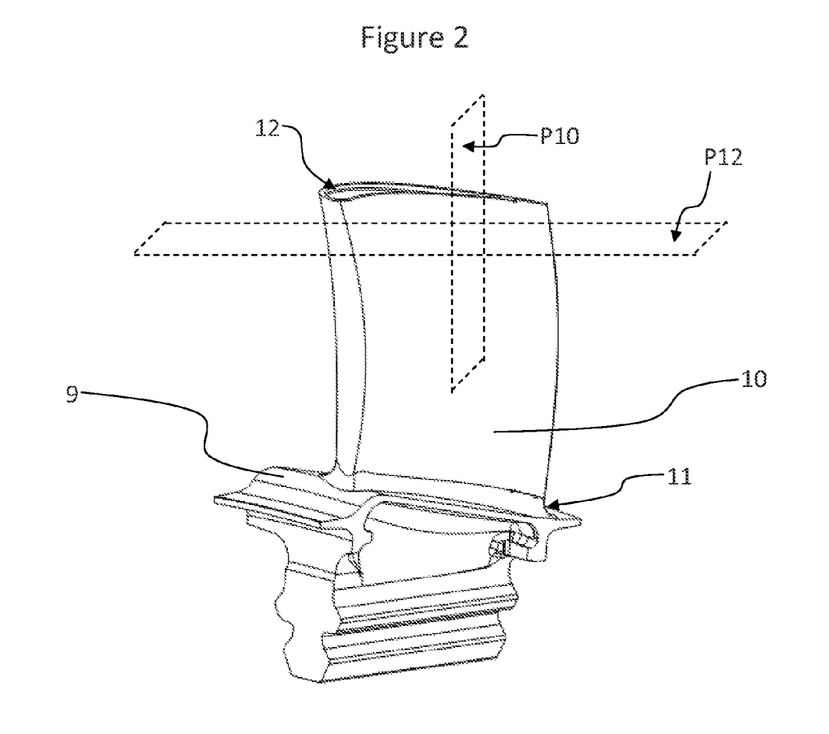
FIG. 2 is a perspective view of a turbine blade according to a first embodiment of the invention.

A turbine blade 10 is shown in more detail in FIG. 2. The blade 10 has a first end 11, via which said blade 10 is fixed to the disk 9 (for example, by a plug-socket type connection), and a second end 12 (or distal end) which constitutes the apex of said blade 10.

Figure 3:
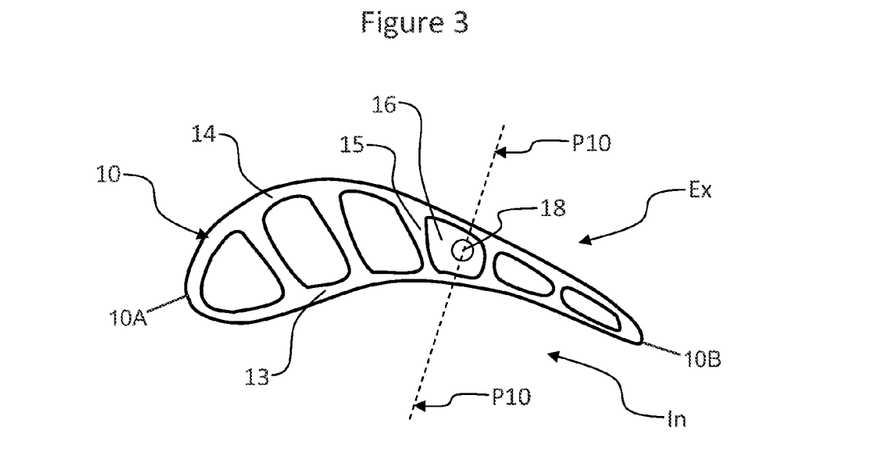
FIG. 3 is a cross-sectional view of the blade of FIG. 2.

With reference to FIG. 3, which is a sectional view of the blade 10 of FIG. 2 along the plane P12 located in the region of the distal end 12, said blade 10 comprises a pressure surface wall 13, located on the pressure side In, and a suction surface wall 14, located on the suction side Ex. Said two walls 13 and 14 extend between the leading edge 10A and the trailing edge 10B of the blade 10.

Figure 4:
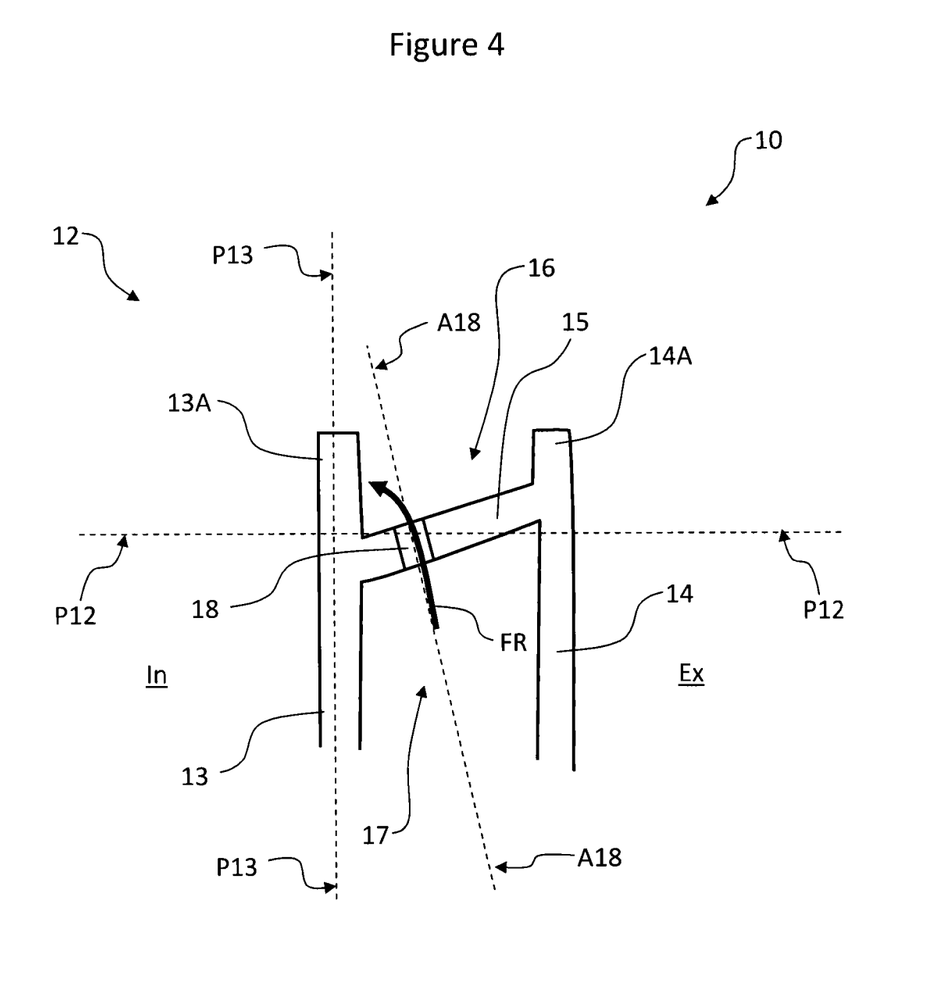
FIG. 4 is an axial sectional view of the blade of FIG. 2.

The blade 10 further comprises a set of partitions connecting the pressure surface wall 13 and suction surface wall 14 and defining a set of internal cavities 17 for the circulation of cooling air (visible in FIG. 4).

With reference now to FIG. 4, which is a view of the blade 10 along the sectional plane P10, the external cavity 16 forming the bathtub-shaped cavity and the internal cavity 17 are separated by the distal wall 15 and are both defined by the pressure surface wall 13, the suction surface wall 14, the partitions and said distal wall 15. More specifically, the bathtub-shaped cavity 16 is defined by the distal end 13A of the pressure surface wall 13, the distal end 14A of the suction surface wall 14, the distal ends of the partitions and finally the distal wall 15.

In order to cool the apex of the blade 10, the passage of a flow of cooling air FR is provided via the internal cavity 17. According to the present invention, an opening 18 is also made in the region of the distal wall 15, so that the flow of air FR reaches the distal end 13A of the pressure surface wall 13, said end 13A forming the zone of the blade where the temperature is the highest and which, therefore, it is important to cool.

The geometry of the distal wall 15 where the opening 18 is located is further determined so that the flow of cooling air FR is directed towards the distal end 13A of the pressure surface wall 13. To this end, the distal wall 15 is inclined relative to the pressure surface wall 13, rising from the pressure side In to the suction side Ex. In this manner, the axis A18 of the opening 18 is inclined relative to the verticals of the pressure surface wall 13.

It will be understood here that the pressure surface wall 13 is curved towards the pressure side, the verticals each corresponding to a plane at right angles to a vertical axis of the wall 13.

Thus, the distal end 13A of the pressure surface wall 13 which constitutes the apex of the blade 10, may be easily cooled by the flow of cooling air FR which permits optimal control of the temperature of said blade 10. Moreover, said incline makes it possible to subject the distal end 14A of the suction surface wall 14 to pressure.

Figure 5:
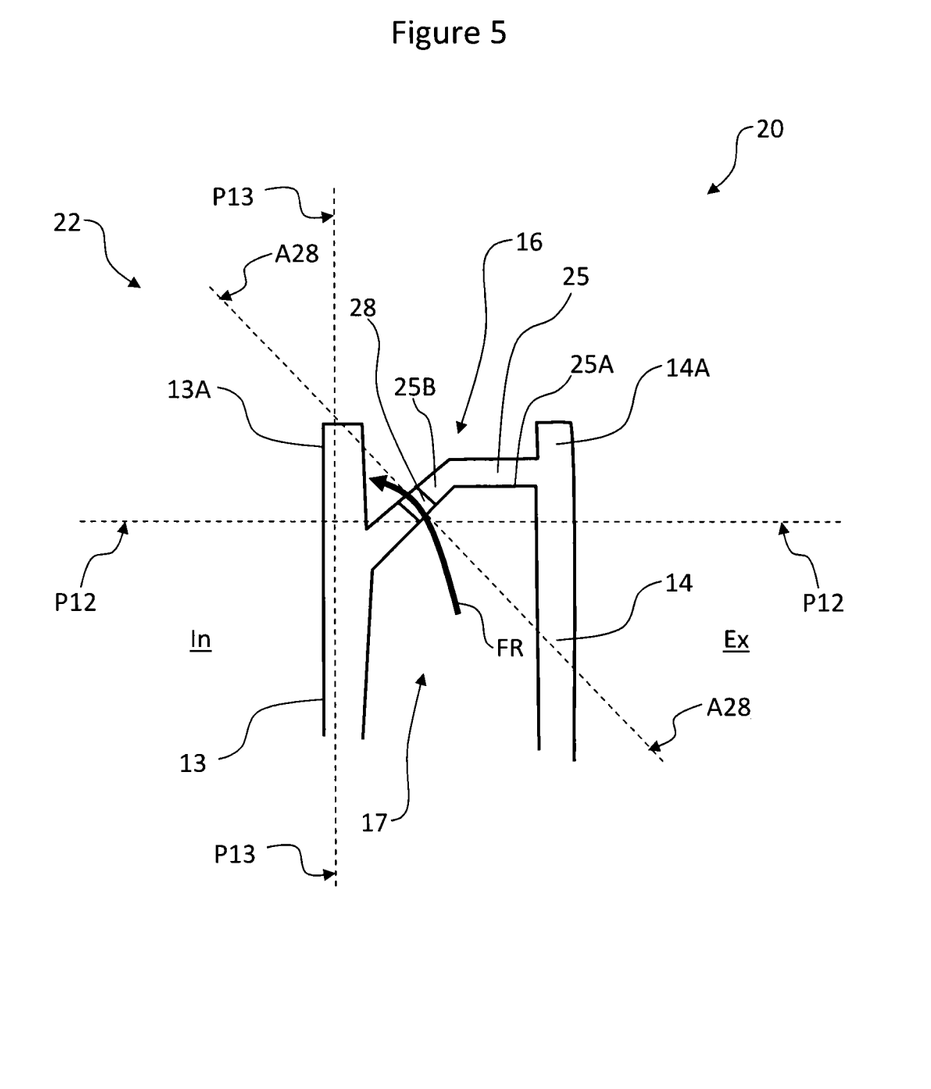
FIG. 5 is an axial sectional view of a turbine blade according to a second embodiment of the invention.

FIG. 5 illustrates a second embodiment of the invention in which the blade 20 is identical to the blade 10 of FIGS. 2 to 4, except as regards the distal wall 25 located at the distal end 22 of said blade 20.

More specifically, the distal wall 25 has two portions joined together: a first planar portion 25A, and a second portion 25B in the region of which an opening 28 is formed (of which the axis A28 is inclined relative to the verticals of the pressure surface wall 13, along a greater incline than that of the axis A18 of the opening 18 formed in the blade 10 of FIGS. 2 to 4) for the passage of a cooling airflow FR.

Thus, as the incline of the axis A28 of the opening 28 is greater than for the opening 18, the flow of cooling air FR may be guided more directly towards the distal end 13A of the pressure surface wall 13 for much improved cooling.

Here again, the incline of the portion 25B of the distal wall 25 promotes a pressurization of the distal part of the blade on the suction side Ex.

Figure 6:
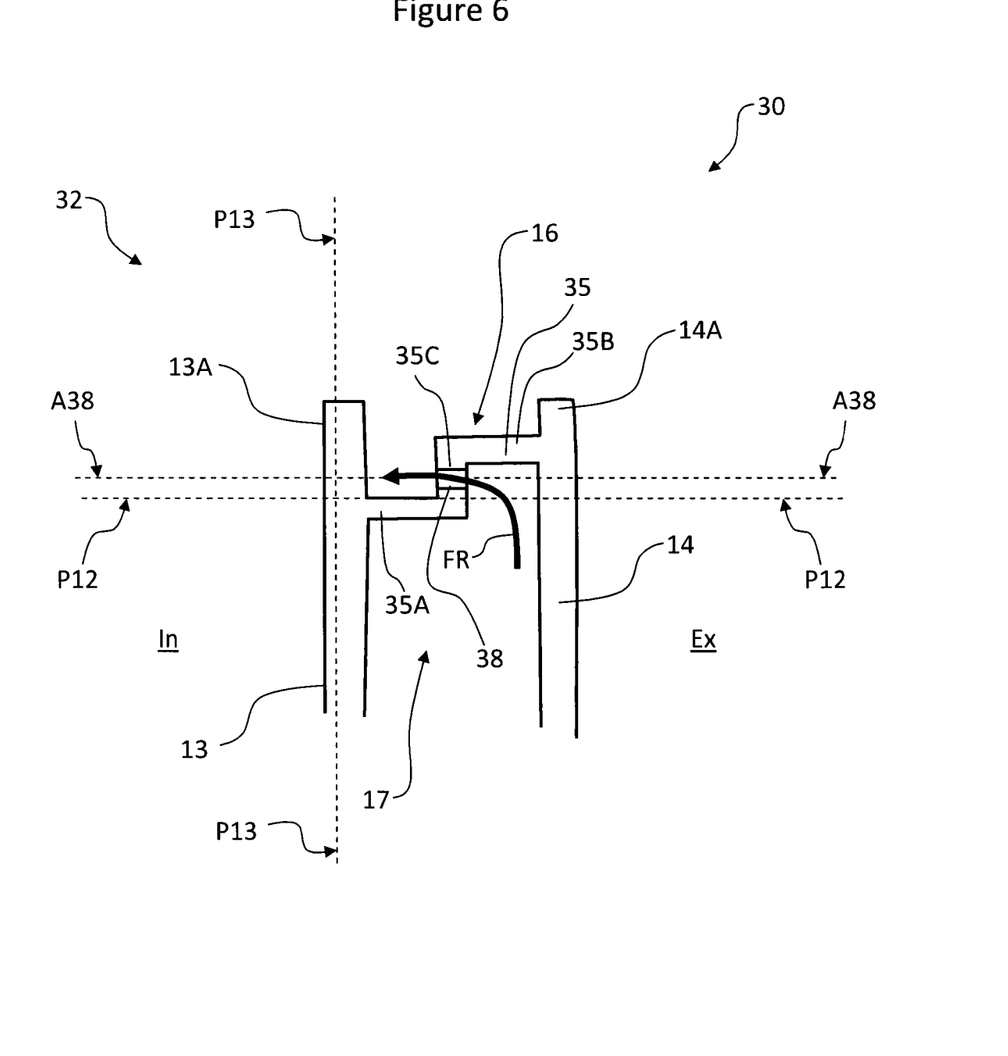
FIG. 6 is an axial section of a blade according to a third embodiment of the invention.

FIG. 6 illustrates a third embodiment of the invention in which the blade 30 is identical to the blade 10 of FIGS. 2 to 4, except regarding the distal wall 35 located at the distal end 32 of said blade 30.

More specifically, the distal wall 35 has three portions joined together: two portions 35A and 35B which are planar and which respectively extend the distal ends 13A and 14A of the pressure surface wall 13 and suction surface wall 14, and a third portion 35C, in the region thereof an opening 38 being formed (of which the axis A38 is at right angles to the pressure surface wall 13) for the passage of the flow of cooling air FR.

Thus, as the axis A38 of the opening 38 is at right angles to the distal end 13A of the pressure surface wall 13, the flow of cooling air FR may be guided even more directly to said end 13A.

Once again, the difference in the level between the portion 35A of the distal wall 35 (on the pressure side In) and the portion 35C (on the suction side Ex) promotes a pressurization of the distal part of the blade on the suction side Ex.

The present invention has been described for different inclines of the axis of the opening and for a different number of portions of the distal wall, but it goes without saying that the person skilled in the art will know how to adapt the invention according to the particular conditions. A number of openings which is greater than one could also be provided in the region of the distal wall.

The invention claimed is:

1. A cooled turbine blade for a gas turbine engine comprising:
   a pressure surface wall;
   a suction surface wall; and
   a distal wall connecting the pressure surface wall and the suction surface wall, arranged so as to create in a region of a distal end of the blade at least one external cavity forming a bathtub-shaped cavity delimited by the pressure surface wall, the suction surface wall, and the distal wall, and at least one internal cavity separated by the distal wall,
   wherein the blade includes at least me opening for the introduction of a flow of cooling air into the external cavity,
   wherein a portion of the distal wall is inclined relative to verticals of the pressure surface wall,
   wherein the opening is provided in the distal wall so that the flow of cooling air is directed towards a distal end of the pressure surface wall, the distal end of the pressure surface wall being a free end, and
   wherein a first end of the distal wall connected to the pressure surface wall is lower than a second end of the distal wall connected to the suction surface wall.

2. The blade according to claim 1, wherein the opening is created in the distal wall so that the flow of cooling air is not directed towards a distal end of the suction surface wall.

3. The blade according to claim 2, wherein the opening is created in the distal wall so that an entire flow of cooling air is directed towards the distal end of the pressure surface wall.

4. The blade according to claim 1, wherein the opening is created in the distal wall so that an entire flow of cooling air is directed towards the distal end of the pressure surface wall and passes along said pressure surface wall.

5. The blade according to claim 1, wherein an axis of the opening is at least substantially inclined relative to the verticals of the pressure surface wall.

6. The blade according to claim 1, wherein the entire distal wall is inclined relative to the pressure surface wall.

7. The blade according to claim 1, wherein another portion of the distal wall is located in a plane at least substantially at right angles to the pressure surface wall.

8. A gas turbine engine comprising at least one turbine blade according to one of the preceding claims.

* * * * *

UNITED STATES PATENT AND TRADEMARK OFFICE
CERTIFICATE OF CORRECTION

PATENT NO.       : 9,435,210 B2
APPLICATION NO.  : 13/693649
DATED            : September 6, 2016
INVENTOR(S)      : Jean-Luc Bacha et al.

Page 1 of 1

It is certified that error appears in the above-identified patent and that said Letters Patent is hereby corrected as shown below:

In the Claims

Column 5, Line 13, change "at least me opening" to --at least one opening--.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*